United States Patent
Liu

(10) Patent No.: US 8,803,492 B2
(45) Date of Patent: Aug. 12, 2014

(54) CROSS-INTERFERENCE REDUCTION OF A BUCK POWER CONVERTER

(75) Inventor: Jing-Meng Liu, Jubei (TW)

(73) Assignee: Richtek Technology Corp., Hsinchu (TW)

( * ) Notice: Subject to any disclaimer, the term of this patent is extended or adjusted under 35 U.S.C. 154(b) by 432 days.

(21) Appl. No.: 12/379,256

(22) Filed: Feb. 18, 2009

(65) Prior Publication Data

US 2009/0206663 A1     Aug. 20, 2009

Related U.S. Application Data

(60) Provisional application No. 61/031,439, filed on Feb. 26, 2008.

(30) Foreign Application Priority Data

Feb. 20, 2008   (TW) ................................ 97105931 A

(51) Int. Cl.
    *G05F 1/00*       (2006.01)
(52) U.S. Cl.
    USPC ............................ 323/266; 323/271; 323/282
(58) Field of Classification Search
    USPC ......................................... 323/266, 282, 271
    See application file for complete search history.

(56) References Cited

U.S. PATENT DOCUMENTS

| | | | | |
|---|---|---|---|---|
| 6,791,390 B2* | 9/2004 | Gay | | 327/332 |
| 7,026,800 B2* | 4/2006 | Liu et al. | | 323/270 |
| 7,629,712 B2* | 12/2009 | Nakashima et al. | | 307/126 |
| 7,688,046 B2* | 3/2010 | Li et al. | | 323/266 |
| 2005/0184712 A1* | 8/2005 | Wei et al. | | 323/282 |

* cited by examiner

*Primary Examiner* — Jue Zhang
*Assistant Examiner* — Lakaisha Jackson
(74) *Attorney, Agent, or Firm* — Muncy, Geissler, Olds & Lowe, P.C.

(57) ABSTRACT

A power converter includes a first conversion stage for converting an input voltage to a first output voltage and a second conversion stage for converting the first output voltage to a second output voltage. An error signal is generated according to a reference voltage and a feedback signal extracted from the second conversion stage, and a feed forward signal is generated from the error signal and injected into the first conversion stage to stabilize the first output voltage. The feedback signal is a function of the second output voltage and thus, the error signal varies with the second output voltage. As a result, the first output voltage will be stabilized when the second output voltage varies, due to the varied feed forward signal.

18 Claims, 13 Drawing Sheets

CROSS-INTERFERENCE REDUCTION OF A BUCK POWER CONVERTER

FIELD OF THE INVENTION

The present invention is related generally to power converters and, more particularly, to cross-interference reduction of a buck power converter.

BACKGROUND OF THE INVENTION

FIG. 1 is a diagram showing a conventional buck power converter 10, which has a voltage input Vin to connect with a high voltage, e.g. 12V, and three voltage outputs Vout1, Vout2, and Vout3 to supply low voltages, e.g. 5V, 3.3V, and 1.8V. FIG. 2 is a simplified circuit diagram showing a power conversion stage 12 to convert the input voltage Vin to the output voltage Vout1, which includes a high-side switch 14 and a low-side switch 16 connected in series between a voltage input Vin and a ground terminal GND by a phase node, and an inductor L connected between the phase node and a voltage output Vout1. The power switches 14 and 16 are alternatively switched by pulse width modulation (PWM) signals 18 and 20 respectively, thereby generating a current IL flowing through the inductor L to charge a capacitor C and thereby generate the output voltage Vout1. In the same way, the output voltages Vout2 and Vout3 of FIG. 1 can be generated. Since the input voltage Vin is a high voltage, the power switches 14 and 16 must be high-voltage components and hence their switching frequency are lower, less than 1 MHz, and in consequence the inductor L and the capacitor C are larger in size.

FIG. 3 is a diagram showing a conventional two-step power converter 22, in which a first conversion stage 24 converts a high voltage Vin1, e.g. 12V, to a low voltage Vout1, e.g. 5V, and a second conversion stage 26 further converts the output voltage Vout1 of the first conversion stage 24 to lower voltages Vout2 and Vout3, e.g. 3.3V and 1.8V. In the two-step power converter 22, since the first conversion stage 24 is connected with the high voltage Vin1, it must uses high-voltage components as illustrated by FIG. 2. The second conversion stage 26 is connected with the low voltage Vout1 and thus doesn't need any high-voltage components. As a result, the switching frequency of the second conversion stage 26 can be increased to more than 4 MHz, and the capacitor and the inductor thereof are smaller in size. Since the two-step power converter 22 requires fewer high-voltage components and smaller inductor and capacitor, and it has a simpler scheme and needs less cost than the conventional power converter 10. However, the two-step power converter 22 induces new problems, specifically the cross-interference between the voltages at different voltage outputs Vout1, Vout2 and Vout3.

In general, to regulate the output voltages Vout1. Vout2 and Vout3 of the power converter 22, they are monitored by respective PWM control loops. FIG. 4 is a circuit diagram of a conventional PWM control loop 28, in which an error amplifier 30 generates an error signal Vc according to a reference voltage Vref and a feedback signal VFB, and a PWM comparator 32 compares the error signal Vc with a ramp signal 34 to generate a PWM signal for alternatively switching the high-side switch and the low-side switch. The feedback signal VFB is a function of its corresponding output voltage, i.e. Vout1, Vout2 or Vout3. As illustrated in Fig.4, the ramp signal 34 is a signal periodically ramping up and down, which can also be a sawtooth-like signal. The term "ramp signal" is used to represent such kind of periodic signals in all this invention for ease of reading. FIG. 5 is a waveform diagram illustrating the cross-interference between the different outputs of the power converter 22, in which waveform 36 represents the current IL2 at the voltage output Vout2, waveform 38 represents the output voltage Vout2, waveform 40 represents the error signal Vc2 corresponding to output voltage Vout2, waveform 42 represents the current IL1 at the voltage output Vout1, waveform 44 represents the output voltage Vout1, and waveform 46 represents the error signal Vc1 corresponding to output voltage Vout1. Referring to FIGS. 3-5, when ripples occur in the output voltage Vout1 because a load transient takes place at the voltage output Vout1 of the two-step power converter 22, if the two-step power converter 22 is designed to control the output voltages Vout2 and Vout3 with current mode, the two-step power converter 22 has a fast and linear transient response to prevent the output voltages Vout2 and Vout3 from being affected. However, if a load transient takes place at the voltage output Vout2 of the two-step power converter 22 at time t1, causing the current IL2 to increase and the output voltage Vout2 to decrease, as shown by the waveforms 36 and 38, the level of the error signal Vc2 will have to increase to stabilize the output voltage Vout2, as shown by the waveform 40. Unfortunately, the voltage input Vin2 of the second conversion stage 26 is connected to the voltage output Vout1 of the first conversion stage 24, and thus the current IL1 of the first conversion stage 24 increases with the current IL2, as shown by the waveform 42, thereby causing the output voltage Vout1 to decrease and the error signal Vc1 to increase for the output voltage Vout1 to recover to the original level. As shown in FIG. 5, in the two-step power converter 22, the output voltage Vout1 is susceptible to the interference resulted from a change in the output voltage Vout2 due o a load variation.

U.S. Pat. No. 7,026,800 to Liu et al. proposed a two-step power converter using a feed forward method to improve the transient response thereof. The output of the first conversion stage in this power converter is not used to provide any converter output voltage, and thus there is no cross-interference between the outputs of the first conversion stage and the second conversion stage. However, it is not cost-efficient because the output voltage of the first conversion stage of the power converter is wasted.

Therefore, it is desired a method to eliminate or reduce the cross-interference between the outputs of the power converter.

SUMMARY OF THE INVENTION

An object of the present invention is to provide a method and arrangement for cross-interference reduction of a buck power converter.

According to the present invention, a power converter includes a first conversion stage for converting an input voltage to a first output voltage and a second conversion stage for converting the first output voltage to a second output voltage, an error signal is generated according to a reference voltage and a feedback signal extracted from the second conversion stage, and a feed forward signal is generated from and thereby a function of the error signal to inject into the second conversion stage. The feedback signal is a function of the second output voltage and thus, the error signal varies with the second output voltage. As a result, the first output voltage will be stabilized when the second output voltage varies, due to the varied feed forward signal injected into the first conversion stage.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 6:
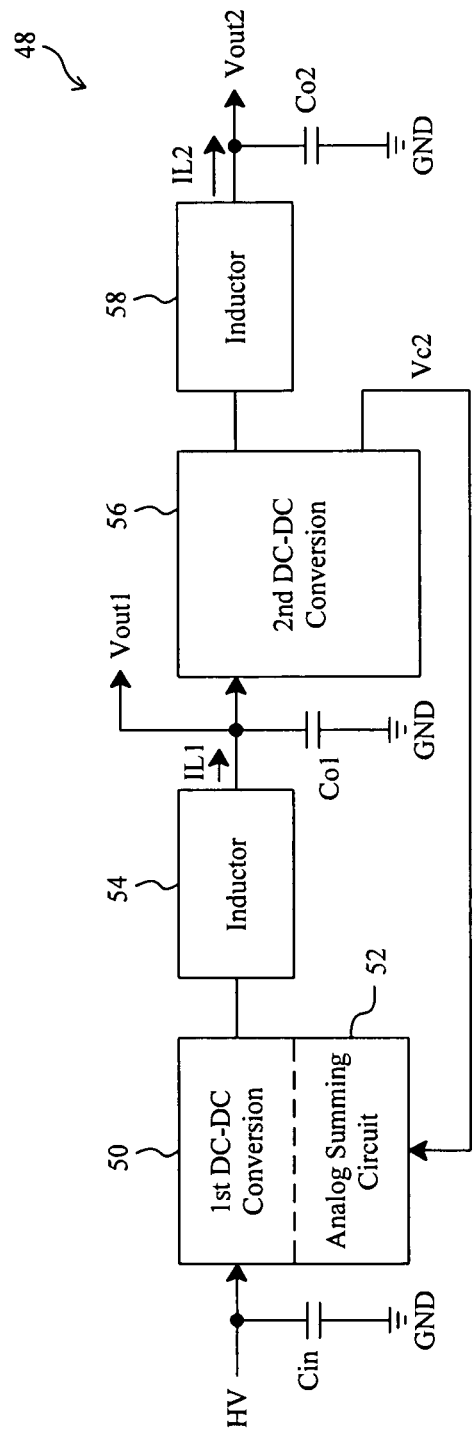
FIG. 6 is a block diagram of a two-step power converter according to the present invention.

According to a first embodiment as shown in FIG. 6, a two-step power converter 48 includes two conversion stages. The first one includes a DC-DC conversion 50 and an inductor 54, and the second one includes a DC-DC conversion 56 and an inductor 58. The first conversion stage converts an input voltage HV to a first output voltage Vout1, and then the second conversion stage converts the first output voltage Vout1 to a second output voltage Vout2. Each of the DC-DC conversions 50 and 56 has one or more pairs of power switches. The DC-DC conversion 56 further includes a PWM control loop for stabling its output voltage Vout2. The PWM control loop for the DC-DC conversion 56 may also refer to FIG. 4. In this case, the error signal Vc2 generated by the PWM control loop for the DC-DC conversion 56 is fed forward to an analog summing circuit 52 of the DC-DC conversion 50, so as to stabilize the output voltage Vout1 of the first conversion stage when the output voltage Vout2 of the second conversion stage varies.

Figure 1:
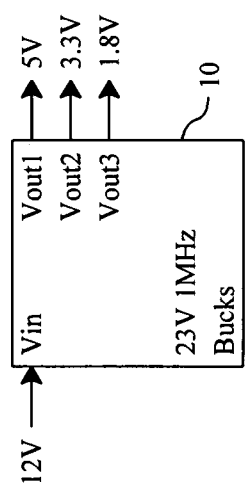
FIG. 1 is a diagram showing a conventional buck power converter.
Figure 2:
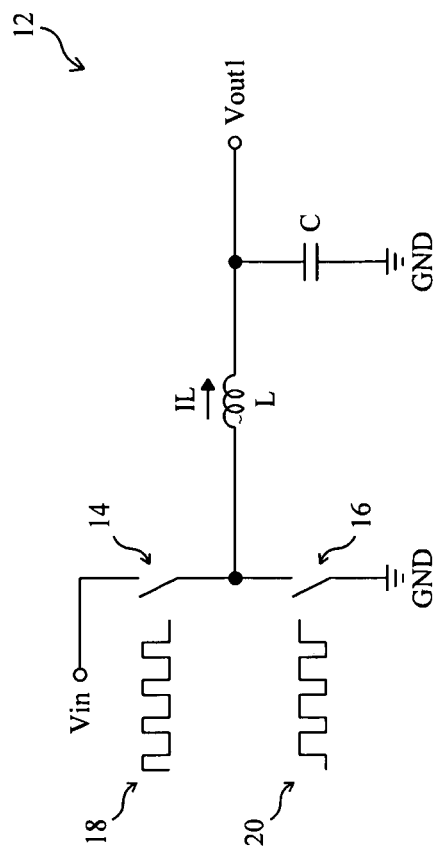
FIG. 2 is a simplified circuit diagram showing a power conversion stage to convert an input voltage Vin to an output voltage.
Figure 3:
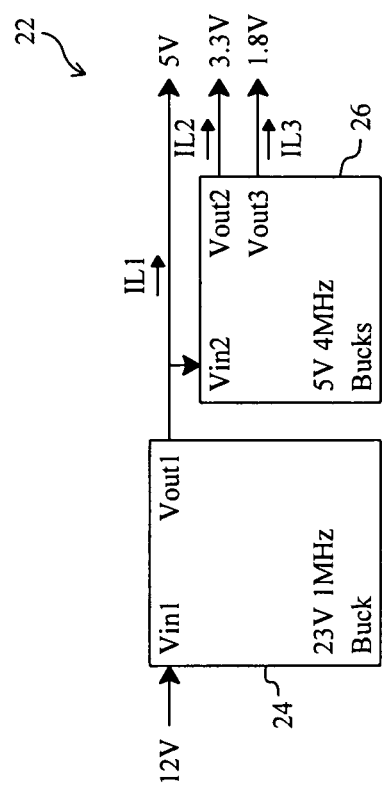
FIG. 3 is a diagram showing a conventional two-step power converter.
Figure 4:
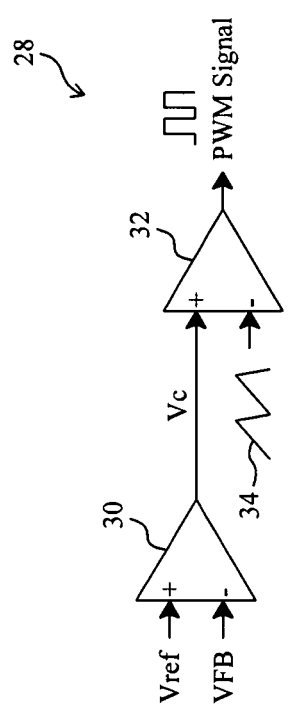
FIG. 4 is a circuit diagram of a conventional PWM control loop.
Figure 5:
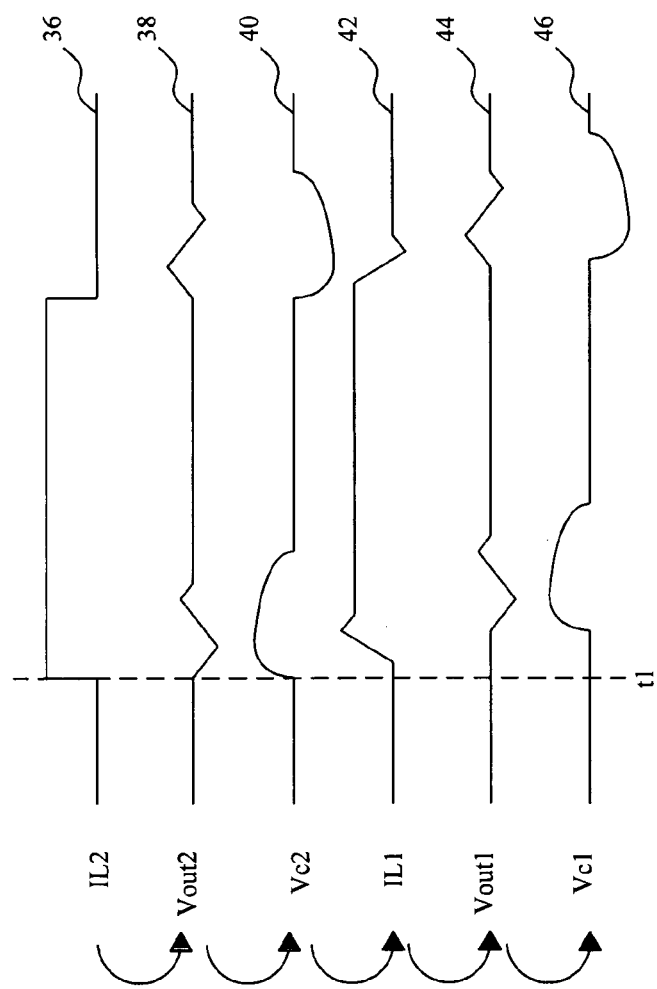
FIG. 5 is a waveform diagram illustrating the cross-interference between the different outputs of the power converter of FIG. 3.
Figure 7:
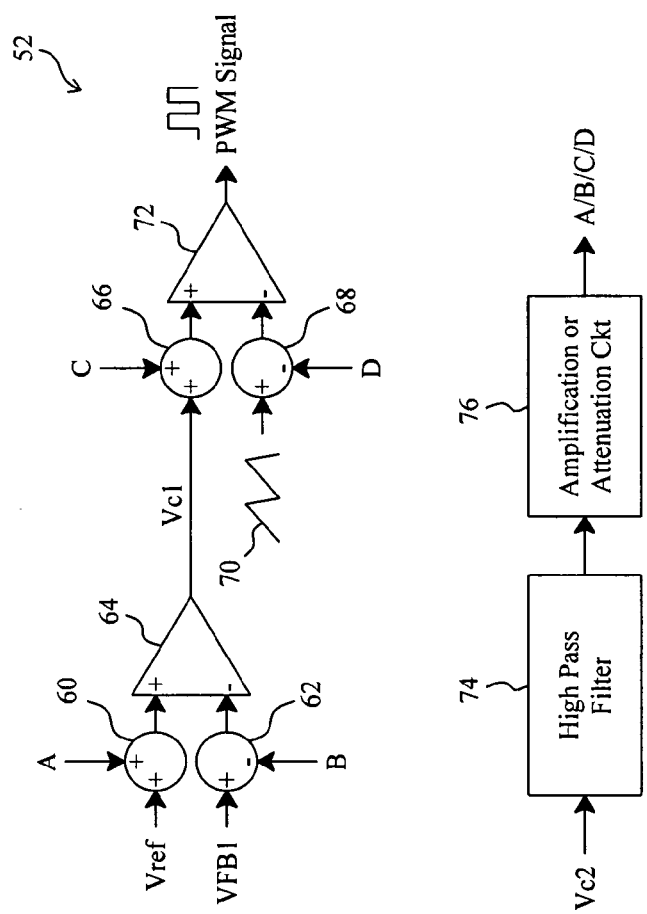
FIG. 7 is a circuit diagram of a preferred embodiment for the analog summing circuit in FIG. 6.

In general, the analog summing circuit 52 is obtained by modifying a typical PWM control loop (as shown in FIG. 4). FIG. 7 is a circuit diagram of a preferred embodiment for the analog summing circuit 52, in which the error amplifier 64 and PWM comparator 72 constitute a typical PWM control loop, and this analog summing circuit 52 further includes one or more of the combiners 60, 62, 66, and 68, a high pass filter 74 and an amplification or attenuation circuit 76. The amplification or attenuation circuit 76 is usually integrated into the error amplifier 64 or the high pass filter 74 and is therefore not indispensable. In FIG. 7, the amplification or attenuation circuit 76 is shown solely for an illustrative purpose. The error signal Vc2 extracted from the second conversion stage is filtered by the high pass filter 74 before being amplified or attenuated by the amplification or attenuation circuit 76 to generate at least one of the signals A, B, C, and D. In one case, the combiner 60 combines the signal A with a reference voltage Vref, and then outputs the summation thereof to the non-inverting input of the error amplifier 64. In another case, the combiner 62 subtracts the signal B from a feedback voltage VFB1 that is derived from and thereby a function of the first output voltage Vout1, and then outputs the difference therebetween to an inverting input of the error amplifier 64. In yet another case, the combiner 66 combines the signal C with the error signal Vc1 produced by the error amplifier 64, and then outputs the summation thereof to a non-inverting input of the PWM comparator 72. In further another case, the combiner 68 subtracts the signal D from a ramp signal 70, and then outputs the difference therebetween to an inverting input of the PWM comparator 72. In any one of the above cases, afterward the PWM comparator 72 will produce a PWM signal with an appropriate duty to regulate the first output voltage Vout1.

Figure 8:
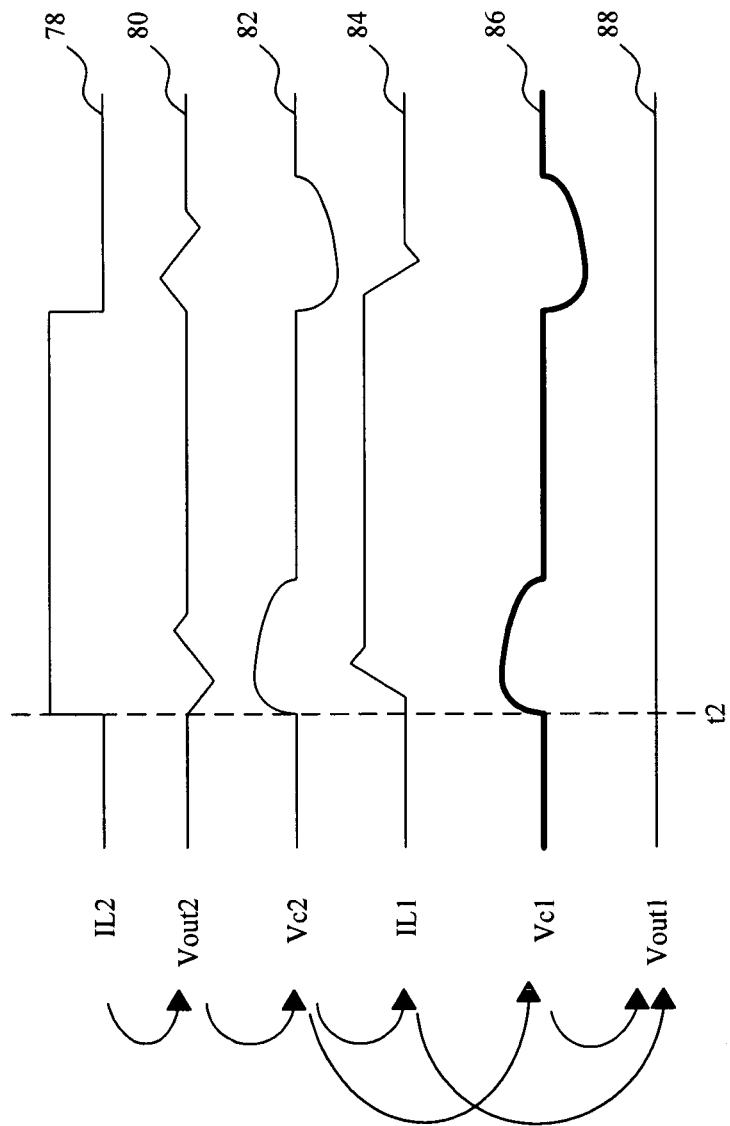
FIG. 8 is a waveform diagram illustrating the cross-interference reduction of a power converter using a feed forward error signal.

FIG. 8 is a waveform diagram illustrating the reduction of the cross-interference between the outputs Vout1 and Vout2 of the power converter 48 using the feed forward error signal Vc2, in which waveforms 78 and 80 represent the current IL2 and voltage at the output Vout2 of the second conversion stage, waveform 82 represents the error signal Vc2 produced by the PWM control loop in the second conversion stage, waveform 84 and 86 represent the current IL1 and voltage at the output Vout1 of the first conversion stage, and waveform 86 represents the error signal Vc1 produced by the PWM control loop in the first conversion stage. Referring to FIGS. 6-8, when a load transient occurs at the output Vout2 of the second conversion stage at time t2, the output voltage Vout2 of the second conversion stage decreases because of an increase in the load current IL2, and in consequence the level of the error signal Vc2 increases so as for the output voltage Vout2 to recover to the original level. Meanwhile, the error signal Vc2 is fed forward to the first conversion stage. In this embodiment, the error signal Vc2 from the second conversion stage affects (or has an equivalent effect on) the error signal Vc1 in the first conversion stage, and hence the error signal Vc1 varies with the error signal Vc2 before the first output voltage Vout1 varies due to the interference from the output Vout2, as shown by the waveform 86. Thus, the incoming current and the outgoing load current IL1 at the output Vout1 of the first conversion stage vary synchronously and are offset by each another, thereby reducing the ripples in the first output voltage Vout1 and, with an optimal design, even completely eliminating the cross-interference between the outputs Vout1 and Vout2, as shown by the waveform 88.

Figure 9:
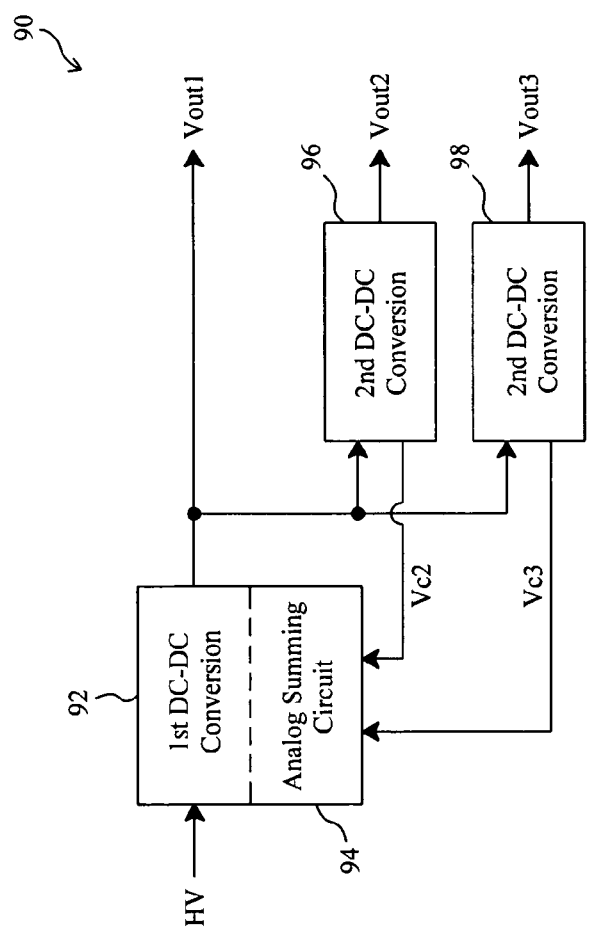
FIG. 9 is a block diagram of another two-step power converter according to the present invention.

FIG. 9 is a block diagram of another two-step buck power converter 90 according to the present invention, in which some components such as inductors and capacitors are omitted for brevity. The power converter 90 converts an input voltage HV to three output voltages Vout1, Vout2, and Vout3, in which a first conversion stage includes a DC-DC conversion 92 for converting the input voltage HV to the output voltage Vout1, and a second conversion stage includes two DC-DC conversions 96 and 98 for converting the output voltage Vout1 to the output voltages Vout2 and Vout3 respectively. The error signals Vc2 and Vc3 generated by the PWM control loops (e.g. see FIG. 4) in the DC-DC conversions 96 and 98 are fed forward to an analog summing circuit 94 of the first DC-DC conversion stage 92, so as to reduce or eliminate the cross-interference between the output Vout1 and the outputs Vout2 and Vout3 whenever a load transient occurs at either the output Vout2 or the output Vout3, and in consequence the output voltage Vout1 is stabilized.

Figure 10:
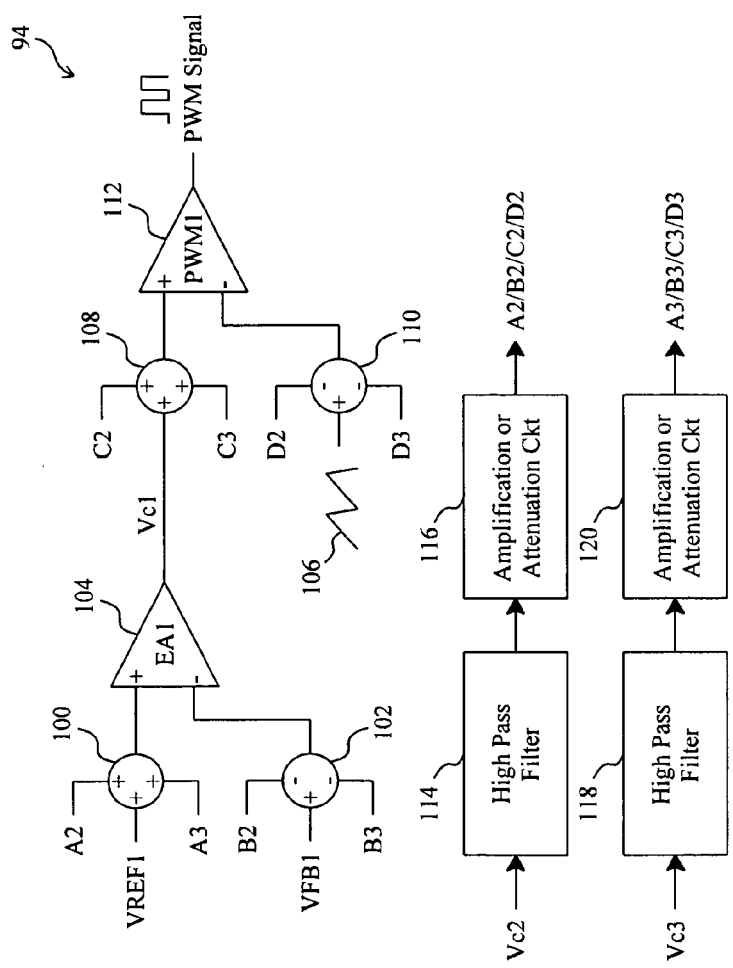
FIG. 10 is a circuit diagram of a first embodiment for the analog summing circuit in FIG. 9.

FIG. 10 is a circuit diagram of a first embodiment for the analog summing circuit 94 of FIG. 9, in which the error signal Vc2 extracted from the DC-DC conversion 96 is processed by a high pass filter 114 and an amplification or attenuation circuit 116 to generate at least one of the signals A2, B2, C2, and D2, and the error signal Vc3 extracted from the DC-DC conversion 98 is processed by a high pass filter 118 and an amplification or attenuation circuit 120 to generate at least one of the signals A3, B3, C3, and D3. In one case, a combiner 100 combines the signals A2 and A3 with a reference voltage Vref1, and then outputs the summation thereof to a non-inverting input of an error amplifier 104. In another case, a combiner 102 subtracts the signals B2 and B3 from a feedback voltage VFB1 that is derived from and thereby a function of the output voltage Vout1, and then outputs the difference therebetween to an inverting input of the error amplifier 104. In yet another case, a combiner 108 combines the signals C2 and C3 with the error signal Vc1 produced by the error amplifier 104, and then outputs the combination thereof to a non-inverting input of a PWM comparator 112. In further another case, a combiner 110 subtracts the signals D2 and D3 from a ramp signal 106, and then outputs the difference therebetween to an inverting input of the PWM comparator 112. In any one of the above cases, afterward the PWM comparator 112 outputs a PWM signal with an appropriate duty so as to regulate the output voltage Vout1. As taught by the aforementioned embodiment, the amplification or attenuation circuits 116 and 120 are usually integrated into the error amplifier 104 or the high pass filters 114 and 118 and are therefore not indispensable. In FIG. 10, the amplification or attenuation circuits 116 and 120 are shown solely for an illustrative purpose.

Figure 11:
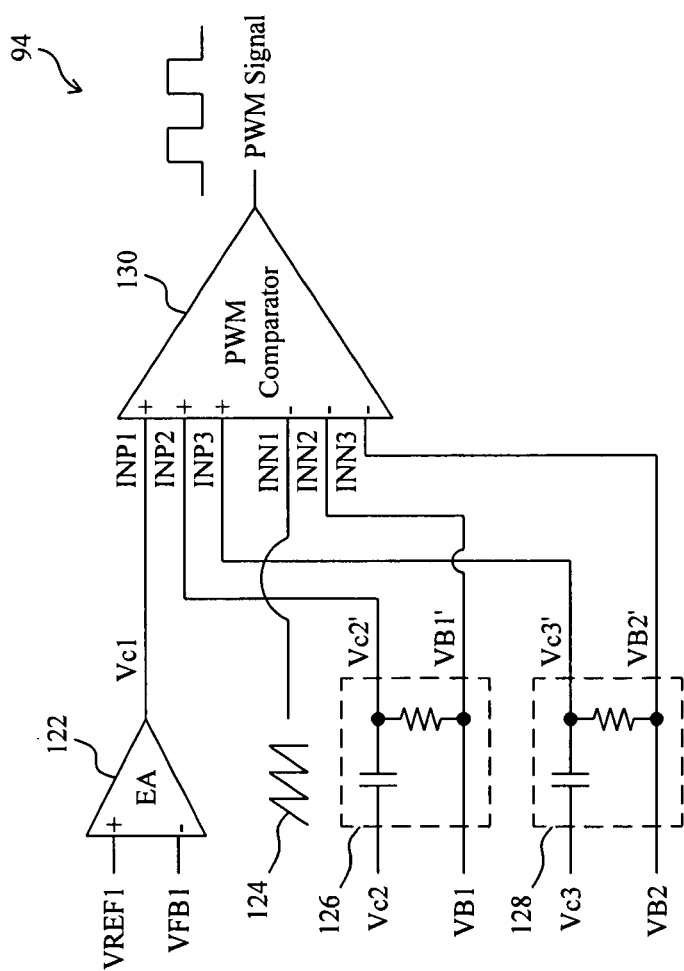
FIG. 11 is a circuit diagram of a second embodiment for the analog summing circuit in FIG. 9.

FIG. 11 is a circuit diagram of a second embodiment for the analog summing circuit 94 of FIG. 9, in which a PWM comparator 130 having multiple pairs of inputs is used in the PWM control loop of the first conversion stage to produce the PWM signal according to various signals. An error signal Vc1 is generated by an error amplifier 122 according to a reference voltage VREF1 and a feedback signal VFB1 that is derived from and thereby a function of the output voltage Vout1, and sent to a non-inverting input INP1 of the PWM comparator 130. A ramp signal 124 is sent to an inverting input INN1 of the PWM comparator 130. The error signal Vc2 extracted from the DC-DC conversion 96 passes through a high pass filter 126 along with any DC bias VB1 to generate signals Vc2' and VB1' (in fact, VB1'=VB1), which are sent to a non-inverting input INP2 and an inverting input INN2 of the PWM comparator 130 respectively. The error signal Vc3 extracted from the DC-DC conversion 98 passes through a high pass filter 128 along with any DC bias VB2 (VB1, VB2 can be equal) to generate signals Vc3' and VB2' (in fact, VB2'=VB2), which are sent to a non-inverting input INP3 and an inverting input INN3 of the PWM comparator 130 respectively. The PWM comparator 130 will produce an appropriate duty according to the signals Vc1, Vc2', Vc3', VB1', and VB2' and the ramp signal 124 for the PWM signal, so as to regulate the output voltage Vout1.

Figure 12:
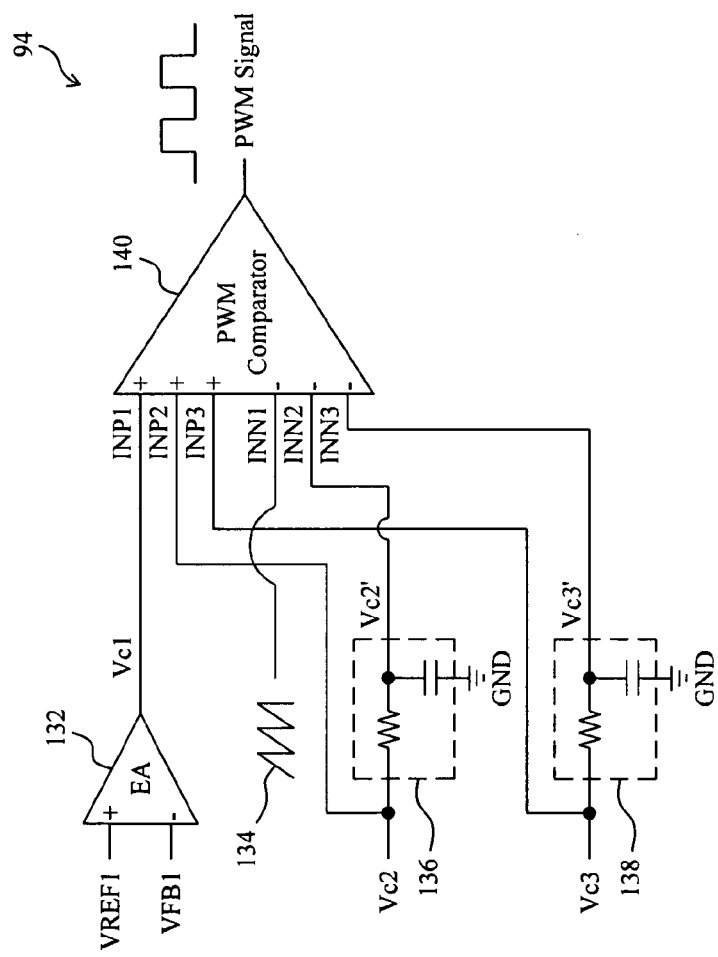
FIG. 12 is a circuit diagram of a third embodiment for the analog summing circuit FIG. 9.

FIG. 12 is a circuit diagram of a third embodiment for the analog summing circuit 94 of FIG. 9, which also uses a PWM comparator 140 having multiple pairs of inputs in the PWM control loop of the first conversion stage for producing the PWM signal. An error signal Vc1 is generated by an error amplifier 132 according to a reference voltage VREF1 and a feedback signal VFB1 that is derived from and thereby a function of the output voltage Vout1, and then sent to a non-inverting input INP1 of the PWM comparator 140. A ramp signal 134 is sent to an inverting input INN1 of the PWM comparator 140. The error signal Vc2 extracted from the DC-DC conversion 96 is sent to a non-inverting input INP2 of the PWM comparator 140. The error signal Vc2 is also filtered by a low pass filter 136 to produce a signal Vc2' sent to an inverting input INN2 of the PWM comparator 140. The error signal Vc3 extracted from the DC-DC conversion 98 is sent to a non-inverting input INP3 of the PWM comparator 140. The error signal Vc3 is also filtered by a low pass filter 138 to produce a signal Vc3' sent to a non-inverting input INN3 of the PWM comparator 140. Therefore, the PWM comparator 140 will produce an appropriate duty according to the signals Vc1, Vc2, Vc3, Vc2', and Vc3' and the ramp signal 134 for the PWM signal, so as to regulate the output voltage Vout1.

Figure 13:
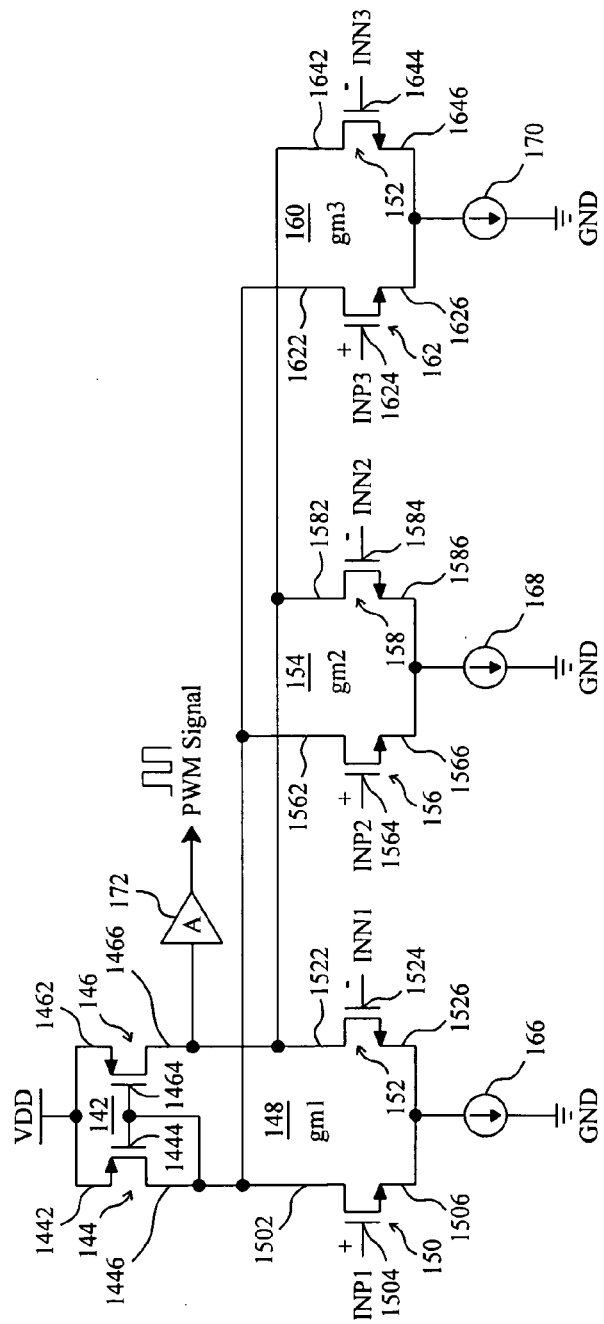
FIG. 13 is a circuit diagram of an embodiment for the PWM comparators in FIGS. 11 and 12.

FIG. 13 is a circuit diagram of an embodiment for the PWM comparators 130 and 140 having multiple pairs of inputs shown in FIGS. 11 and 12, in which a current mirror 142 is constructed by two MOS transistors 144 and 146, whose sources 1442 and 1462 are connected together to a voltage source VDD, and gates 1444 and 1464 are connected together to a drain 1446 of the MOS transistor 144, and provides two branches, namely a reference side branch and a mirror side branch, by the drains 1446 and 1466 of the MOS transistors 144 and 146, respectively. The PWM comparator further includes three input stages 148, 154, and 160, each of which has a pair of MOS transistors and a current source for bias thereto. The three input stages 148, 154, and 160 are transconductive amplifiers, each of which converts the difference between its two input voltage signals into a current signal. The input stage 148 has a transconductance gm1 and the other two input stages 154 and 160 have transconductances gm2 and gm3, respectively (gm1, gm2, gm3 are identical or different as needed). In the input stage 148, drains 1502 and 1522 of MOS transistors 150 and 152 are connected to the drains 1446 and 1466 of the MOS transistors 144 and 146, respectively, sources 1506 and 1526 of the MOS transistors 150 and 152 are connected together to a current source 166, and gates 1504 and 1524 of the MOS transistors 150 and 152 are for the pair of inputs INP1 and INN1, respectively. In the input stage 154, drains 1562 and 1582 of MOS transistors 156 and 158 are connected to the drains 1446 and 1466 of the MOS transistors 144 and 146, respectively, sources 1566 and 1586 of the MOS transistors 144 and 146 are connected together to a current source 168, and gates 1564 and 1584 of the MOS transistors 156 and 158 are for the pair of inputs INP2 and INN2, respectively. In the input stage 160, drains 1622 and 1642 of MOS transistors 162 and 164 are connected to the drains 1446 and 1466 of the MOS transistors 144 and 146, respectively, sources 1626 and 1646 of the MOS transistors 162 and 164 are connected together to a current source 170, and gates 1624 and 1644 of the MOS transistors 162 and 164 are for the pair of inputs INP3 and INN3, respectively. A gain stage 172 amplifies the voltage on the drain 1466 of the mirror side transistor 146 to generate the PWM signal.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A feed forward method for cross-interference reduction of a buck power converter including a first conversion stage converting an input voltage to a first output voltage and a second conversion stage converting the first output voltage to a second output voltage, with which both the first output voltage and the second output voltage can supply different output loads with stable voltages simultaneously, comprising the steps of:
  generating a first error signal according to a reference voltage and a feedback signal, wherein the feedback signal is a function of the second output voltage;
  generating a feed forward signal from the first error signal; and
  reducing cross-interference to maintain the first output voltage at a target value by injecting the feed forward signal to a control loop of the first conversion stage to cancel part or all transient interference from the second conversion stage to the first conversion stage when a load transient event is happening at the second output voltage.

2. The method of claim 1, wherein the step of generating a teed forward signal from the first error signal comprises the step of filtering the first error signal.

3. The method of claim 1, wherein the step of generating a feed forward signal from the first error signal comprises the steps of
  filtering the first error signal; and
  amplifying or attenuating the filtered error signal.

4. The method of claim 1, wherein the step of reducing cross-interference to maintain the first output voltage at the target value by injecting the feed forward signal to control the loop of the first conversion stage to cancel part or all transient interference from the second conversion stage to the first conversion stage when the load transient event is happening at the second output voltage comprises the steps of:
  generating a second error signal according to a second reference voltage and a second feedback signal, wherein the second feedback signal is a function of the first output voltage; and
  combining the feed forward signal and the second error signal and comparing the combined signal with a ramp signal to generate a PWM signal.

5. The method of claim 1, wherein the step of reducing cross-interference to maintain the first output voltage at the target value by injecting the feed forward signal to control the loop of the first conversion stage to cancel part or all transient interference from the second conversion stage to the first conversion stage when the load transient event is happening at the second output voltage comprises the steps of:
  generating a second error signal according to a second reference voltage and a second feedback signal, wherein the second feedback signal is a function of the first output voltage;
  transmitting the feed forward signal through a high pass filter to generate a first filtered signal; and
  transmitting the second error signal, the first filtered signal and a ramp signal to a PWM modulator circuit, to thereby generate a PWM signal for regulating the first output voltage.

6. The method of claim 5, wherein the PWM modulator circuit includes a comparator having multiple inputs.

7. The method of claim 1, wherein the step of reducing cross-interference to maintain the first output voltage at the target value by injecting the feed forward signal to control loop of the first conversion stage to cancel part or all transient interference from the second conversion stage to the first conversion stage when the load transient event is happening at the second output voltage comprises the steps of:
  generating a second error signal according to a second reference voltage and a second feedback signal, wherein the second feedback signal is a function of the first output voltage; and
  transmitting the feed forward signal through a low pass filter to generate a second filtered signal; and
  transmitting the feed forward signal, the second error signal, the second filtered signal, and a ramp signal to a PWM modulator circuit, to thereby generate a PWM signal for regulating the first output voltage.

8. The method of claim 7, wherein the PWM modulator circuit includes a comparator having multiple inputs.

9. The method of claim 1, wherein the buck power converter comprises more than one the second conversion stages connected in parallel.

10. A buck power converter comprising:
  a first conversion stage converting an input voltage to a first output voltage;
  a second conversion stage converting the first output voltage to a second output voltage;
  an error amplifier generating a first error signal according to a reference voltage and a first feedback signal, wherein the first feedback signal is a first function of the second output voltage; and
  an analog summing circuit receiving a feed forward signal to reduce cross-interference to maintain the first output voltage at a target value by injecting the feed forward signal to a control loop of the first conversion stage to cancel part or all transient interference from the second conversion stage to the first conversion stage when a load transient event is happening at the second output voltage, wherein the feed forward signal is a second function of the error signal;
  wherein both the first output voltage and the second output voltage can supply different output loads with stable voltages simultaneously.

11. The power converter of claim 10, wherein the analog summing circuit comprises:
  a second error amplifier generating a second error signal according to a second reference voltage and a second feedback signal, wherein the second feedback signal is a third function of the first output voltage;
  a high pass filter filtering the feed forward signal and a DC bias voltage to generate a first filtered signal and a second filtered signal; and
  a PWM comparator having multiple inputs receiving the second error signal, the first filtered signal, the second filtered signal and a ramp signal, to thereby generate a PWM signal for regulating the first output voltage.

12. The power converter of claim 10, wherein the analog summing circuit comprises:
  a second error amplifier generating a second error signal according to a second reference voltage and a second feedback signal, wherein the second feedback signal is a third function of the first output voltage;
  a low pass filter filtering the feed forward signal to generate a filtered signal; and
  a PWM modulator circuit receiving the second error signal, the feed forward signal, the filtered signal and a ramp signal, to thereby generate a PWM signal for regulating the first output voltage.

13. The method of claim 12, wherein the PWM modulator circuit includes a comparator having multiple inputs.

14. The power converter of claim 10, wherein the feed forward signal is identical with the first error signal.

15. The power converter of claim 10, comprising more than one of the second conversion stages connected in parallel.

16. The power converter of claim 10, further comprising a filter filtering the error signal to generate the feed forward signal.

17. The power converter of claim 10, further comprising:
a filter filtering the error signal; and
an amplification or attenuation circuit amplifying or attenuating the filtered error signal to thereby generate the feed forward signal.

18. The power converter of claim 10, wherein the analog summing circuit combines the feed forward signal with one or more of the following signals of the first conversion stage:
   (1) a second reference voltage;
   (2) a second feedback signal, which is a function of the first output voltage;
   (3) a second error signal, which is a function of a difference between the second feedback signal and the second reference voltage; or
   (4) a ramp signal.

* * * * *